(No Model.) 2 Sheets—Sheet 1.

R. WEIGEL.
LOCOMOTIVE AND TRAIN BRAKE.

No. 425,356. Patented Apr. 8, 1890.

WITNESSES:
A. Schehl
T. Reimherr

INVENTOR
Robert Weigel
BY
Soepel & Raegener
ATTORNEYS (No Model.) 2 Sheets—Sheet 2.
R. WEIGEL.
LOCOMOTIVE AND TRAIN BRAKE.
No. 425,356. Patented Apr. 8, 1890.
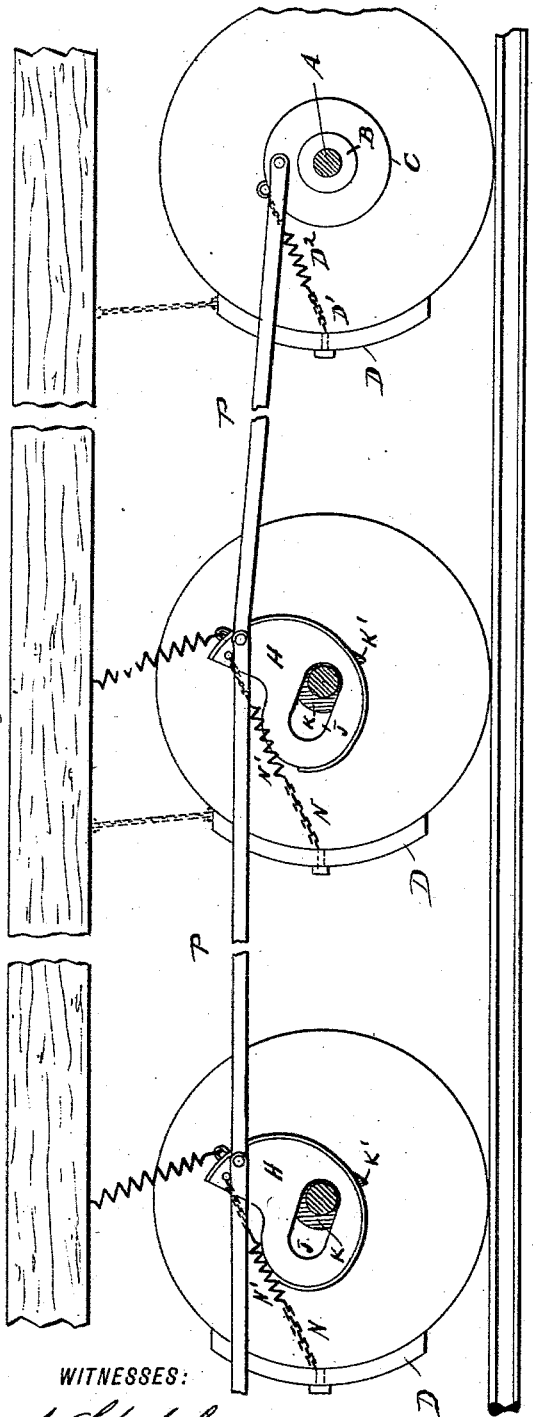
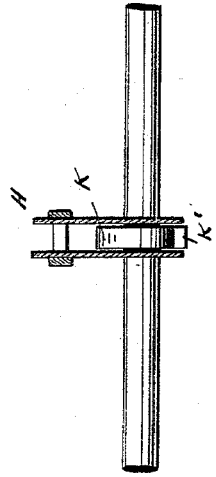
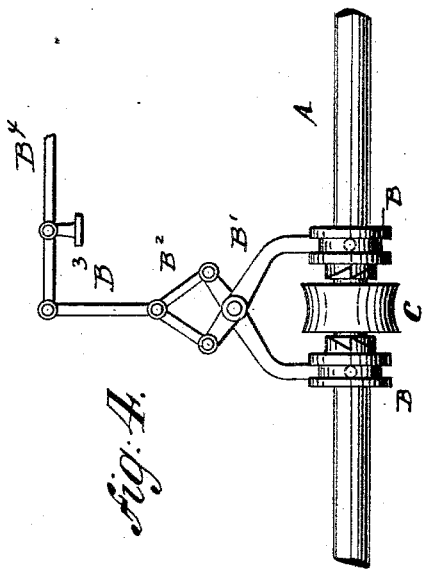
WITNESSES:
A. Schehl.
W. Reinkur
INVENTOR
Robert Weigel
BY
Goepel & Raegener
ATTORNEYS

UNITED STATES PATENT OFFICE.

ROBERT WEIGEL, OF NEW YORK, N. Y., ASSIGNOR, BY DIRECT AND MESNE ASSIGNMENTS, OF THREE-FOURTHS TO LOUIS CARLÉ, OF SAME PLACE, AND LEON DEUTSCH AND HUGO S. MACK.

LOCOMOTIVE AND TRAIN BRAKE.

SPECIFICATION forming part of Letters Patent No. 425,356, dated April 8, 1890.

Application filed November 15, 1889. Serial No. 330,399. (No model.)

*To all whom it may concern:*

Be it known that I, ROBERT WEIGEL, a subject of the Emperor of Germany, of the city of New York, in the county of New York and State of New York, have invented certain new and useful Improvements in Train and Locomotive Brakes, of which the following is a specification.

The object of my invention is to provide a new and improved auxiliary brake for locomotives and railway-trains, which can readily be applied to stop and check the entire train instantly.

The invention consists in the construction and combination of parts and details, as will be fully described hereinafter, and finally be pointed out in the claims.

Figure 1:
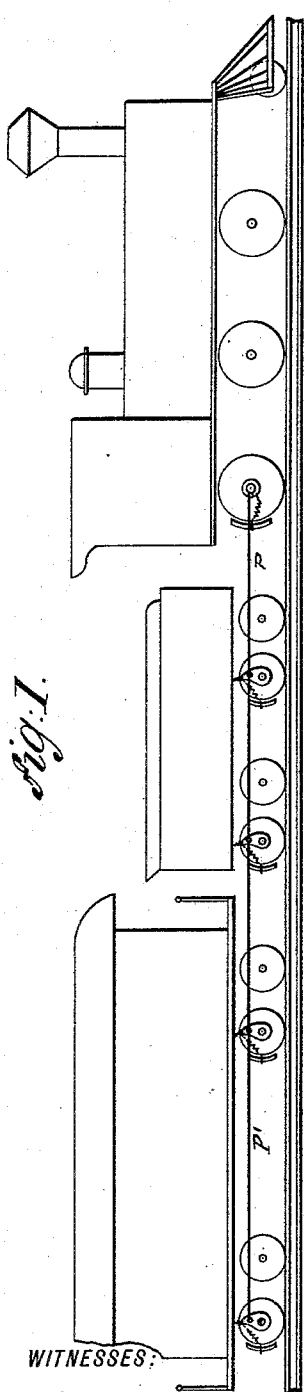
Figure 2:
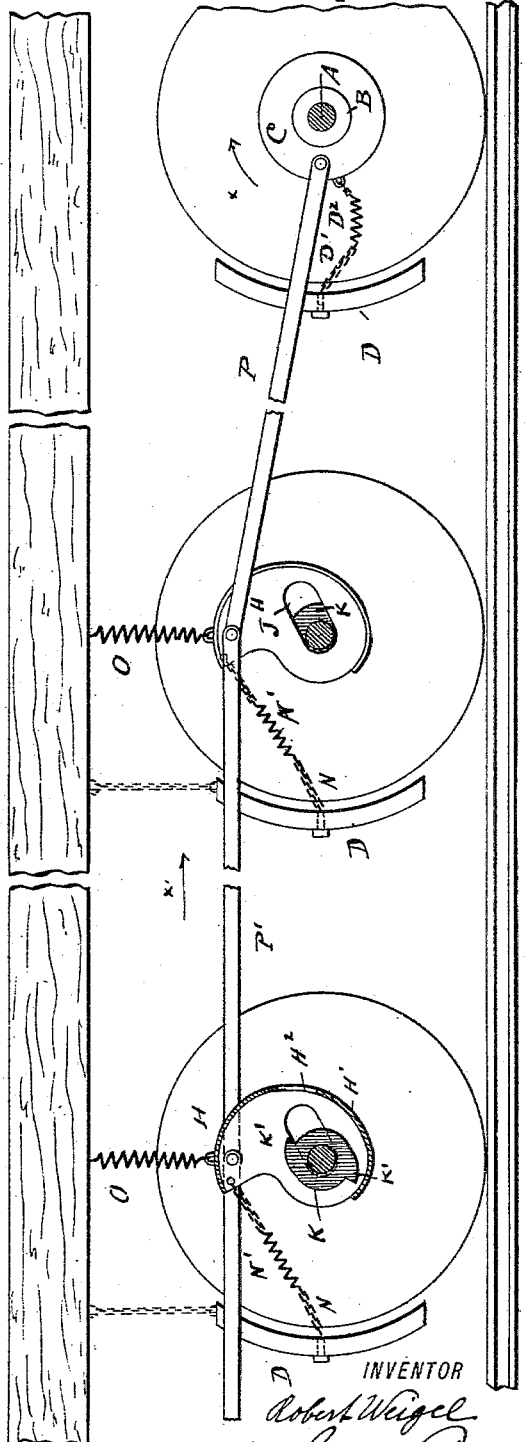

In the accompanying drawings, Figure 1 is a side view of a locomotive, tender, and car provided with my improved auxiliary brake. Fig. 2 is a side view of a locomotive-wheel and a tender and car wheel provided with my improved brake, the parts being shown in the position that they have when the brakes are not applied. Fig. 3 is a similar view showing the positions the parts have when the brakes are applied. Fig. 4 is a side view of the clutching device on the locomotive-axle. Fig. 5 is a cross-sectional view of the box on the tender or car axles.

Similar letters of reference indicate corresponding parts.

On the rear axle A of a locomotive the two sliding clutch-collars B, are mounted in such a manner that they rotate with the axle and slide on the same, which clutch-collars are adapted to engage a pulley C, loosely mounted on the axle A. The clutch-collars B are connected by levers B', B², and B³, with a lever B⁴ in the cab, so that the engineer, by depressing one end of the lever B⁴, can engage the clutch-collars B with the pulley C, thus locking the said pulley on the axle. Adjacent to the rear wheel of each car-truck, the rear wheel of each tender-truck, and the rear wheel of the locomotive, a brake-shoe D is provided and hung in the usual manner. The brake-shoe D of the rear locomotive-wheel is connected by a chain D', in which a spring D² is arranged with the pulley C. On the axle of the rear wheel of each tender and car truck a box H is loosely mounted, which has a curved side H', provided with a slot H², the axle passing through inclined slots J in the sides of the box.

Within each box a disk K is rigidly mounted on the axle, which disks are each provided with two opposite hook-prongs K', that can enter the slot H² of the corresponding box H. The brake-shoes D of each rear wheel of tender and car trucks are connected by a chain N, provided with a spring N', with the top of the box H of the corresponding axle.

The boxes H are suspended at their top by springs O from the bottom of the car.

Bars P are connected with the pulley C on the locomotive-axle, and the boxes H on the rear axle of the front tender-truck, and bars P' connect the box H on the rear axle of the front tender-truck with the rear axle of the rear truck of the tender, and in a like manner the boxes H on the several rear axles of the several trucks are connected with each other.

The brake-shoes are secured to brake-beams, which are supported or hung in the usual manner, but are not shown, as they form no essential part of my invention.

The operation is as follows: Ordinarily when the brake is not applied, the box H and connecting-bars and the pulley C are in the position shown in Fig. 2. The disks K can now revolve in the boxes H, and the hook-prongs H do not engage the slots of the boxes. When the train is to be stopped, the clutch-collars B are engaged with the loose pulley C, whereby said pulley is rotated in the direction of the arrow $x$, Fig. 2, and draws the brake-shoes D against the rear wheels of the locomotive, and at the same time draws the bars P and P' in the direction of the arrow $x'$. Thereby the upper ends of the boxes H are swung downward and in the direction of the arrow $x'$, and the lower ends are swung upward and in the reverse direction of the arrow $x'$, so that the prongs K' of the disks K, fixed on the axles, can pass into the slots H² of the boxes H. Thereby the axles and the wheels on the same are prevented from rotating. By the movements of the upper ends of the boxes in the direction of the arrow $x'$ the brake-shoes D, adjacent to the wheels, are pressed against the rims of the wheels by the chains N. By locking the pulley C on the locomotive-axle all the brake-shoes D are pressed against the wheel and at the same time the several axles and wheels are prevented from rotating. After the train has been stopped, it is moved backward slightly, whereby the boxes H are brought back into the position shown in Fig. 2.

My improved brake is only to be used as an auxiliary brake, or, in other words, it is only to be used in case of an emergency—for example, in order to avoid a collision. Ordinarily the usual hand, air-vacuum, or steam brake is to be used.

Having thus described my invention, I claim as new and desire to secure by Letters Patent—

1. In a locomotive, the combination, with one of the axles, of a loose pulley on the same, means for locking said pulley on the axle, brake-shoes adjacent to the wheel-rims, and chains connecting the brake-shoes with said loose pulley, substantially as set forth.

2. In a locomotive, the combination, with one of the axles, of a loose pulley on the same, means for locking the pulley on the axle, brake-shoes adjacent to the locomotive and car wheels connected with said loose pulley, substantially as set forth.

3. The combination, with a car-axle, of a pronged disk fixed rigidly on the same, a box having slots in its sides, through which slots the axle passes, which box also has a curved side provided with a slot, and connecting-bars connecting the boxes with each other, substantially as set forth.

4. The combination, with a car-axle, of a pronged disk fixed rigidly on the same, a box having slots in its sides, through which slots the axle passes, which box also has a curved side provided with a slot, connecting-bars connecting the boxes on the axles with each other, and a brake-shoe connected with each box, substantially as set forth.

5. The combination, with a locomotive and cars, of a loose pulley on the locomotive-axle, means for locking said loose pulley on the locomotive-axle, brake-shoes for the locomotive-wheels connected with said loose pulley, brake-shoes for the car-wheels, swinging boxes on the car-wheel axles, fixed pronged disks on the axles within the boxes, and rods connecting said boxes with each other, and the loose pulley on the locomotive-axle, substantially as set forth.

In testimony that I claim the foregoing as my invention I have signed my name in presence of two subscribing witnesses.

ROBERT WEIGEL.

Witnesses:
OSCAR F. GUNZ,
MARTIN PETRY.